June 6, 1939. J. W. WABER 2,161,490
INNER TUBE
Filed Nov. 1, 1937
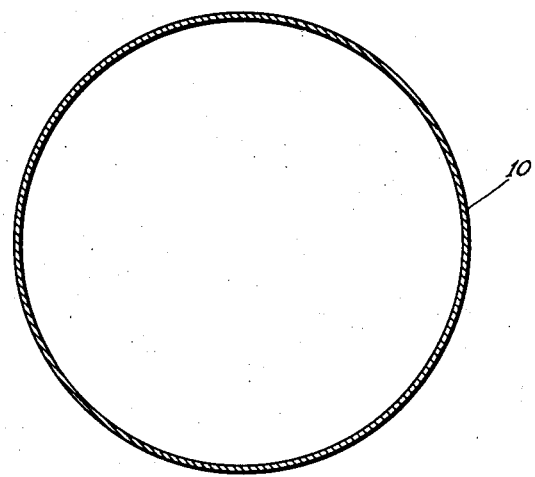
Fig. I.
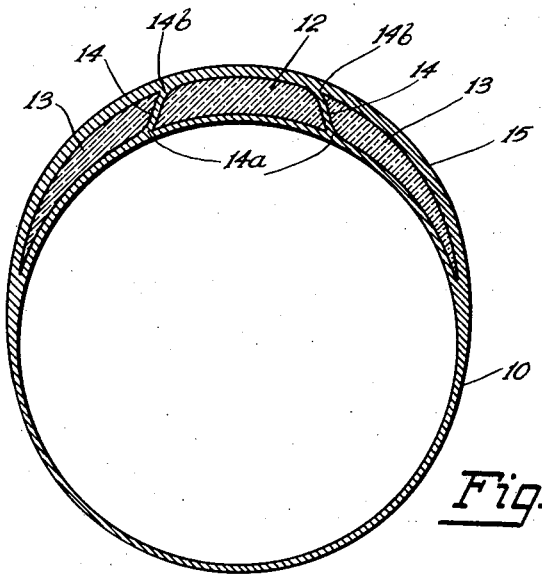
Fig. 2.
Inventor:
James W. W. Waber.
By C. P. Soper
Atty.

Patented June 6, 1939

2,161,490

UNITED STATES PATENT OFFICE 2,161,490

INNER TUBE

James W. Waber, Chicago, Ill.

Application November 1, 1937, Serial No. 172,095

5 Claims. (Cl. 154—15)

This invention relates to improvements in inner tubes and the process of making and particularly to a tube such as is commonly referred to as a puncture-proof tube, or more accurately as a self-sealing tube.

The present invention is a modification of the tubes disclosed in applicant's Patents 1,808,091 and 2,033,962 and may be made by the methods described in said patents, although its manufacture is not limited to the use of the previously described methods.

The tube herein disclosed differs from the tube of the above noted patents in that the mastic, or unvulcanizable plastic material, is divided longitudinally into a plurality of strips by intervening partitions of vulcanizable material.

When self-sealing tubes having plastic type rubber compounds in the tread portion thereof are used in tires on vehicles that are driven at exceedingly high speeds for long periods of time, without occasionally dropping to average or low speed, as for instance in racing cars, there is a tendency for the centrifugal force to throw the plastic material toward the center-line of the tube and away from the portion of the tube usually termed the "shoulder", causing the plastic material to become of increased thickness at the center of the tread portion and of less thickness at the sides of the tread portion. This diminishes the amount of puncture protection at the shoulders of the tire, i. e., at the areas in which the plastic material was reduced in thickness by the centrifugal action.

The present invention is designed to prevent any substantial migration of the plastic material due to the centrifugal action at sustained high speeds It may be here noted that, due to the nature of the plastic material, displacement thereof does not occur to any distinguishable degree under ordinary use, even at high speeds, when the periods of high speed are interspersed with a fair percentage of periods of average driving speed.

However, there are occasions when it is desirable to have an efficient self-sealing tube of the plastic sealing type that can be successfully used at sustained high speeds for long periods and the present tube fulfils this requirement.

It is believed the further disclosure of the invention will be readily understood from a detailed description thereof taken in connection with the accompanying drawing in which Fig. 1 shows a cross section of the basic tube element which may be of substantially the same character as non-self-sealing tubes now on the market; and Fig. 2 is a cross section through the completed tube, showing the partitions or baffles of vulcanizable material which separates the plastic sealing compound into longitudinal strips.

Referring now to the drawing in which like reference characters indicate the same parts in both views:

The basic tube 10, of vulcanizable material, has applied to the tread portion thereof a crescent-shaped layer of plastic material comprising the central strip 12 and the side strips 13. Extending longitudinally of the plastic material and providing partitions or baffles between the central plastic section 12 and the side sections 13 are the strips 14 of vulcanizable material, the inner edges of strips 14 being joined to the basic tube 10, as by vulcanization thereto and the outer edges being firmly secured to the cover layer 15 of vulcanizable material.

The preferred method of making the tube of the present invention will now be described. The basic tube 10 is first formed as an annular, endless tube of a size slightly smaller than the cavity within the casing with which it is to be used. A valve stem (not shown) is next inserted in tube 10 and it is inflated to a point where it is fully expanded but under little if any, tension, i. e., to about the size it will have when the tube is completed. The expanded tube 10 is now mounted on a revolving building drum, preparatory to placing the mastic material and cover strip thereon. The process so far is the same as described in the above-mentioned patents.

The following steps in the present process differ from previous disclosures. Along the center of the tread portion of the tube 10 is placed the strip 12 of unvulcanizable material. On each side of the strip 12 is then placed a partition or baffle 14 of vulcanizable material. The baffles 14 at their inner ends are arranged to engage the tube 10 as indicated at 14a. The strips 13 of plastic material are then placed on the tread portion of tube 10, one on each side of the central strip 12 and in engagement with the baffles 14, respectively. A cover strip 15 of vulcanizable material is then placed over the mastic strips with its opposite edges in engagement with the tube 10. The outer edges of the baffles 14 are arranged to be engaged by the cover strip 15 as indicated at 14b.

From this point the process may be such as described in the above noted patents. After the tube is built up as above described it is placed in a mould of the correct size and shape and heat applied, the internal pressure of the tube being increased to an amount sufficient to insure a smooth and finished exterior. When the proper time has elapsed, the heat is withdrawn and the finished tube removed from the mould, which completes the process. The inner edges of the partitions 14 are now firmly vulcanized to the basic tube 10 and the outer edges of the partitions will be vulcanized to the cover strip 15.

Patent 2,033,962 discloses the expedient of treating the tread portion of the basic tube 10, which underlies the cover layer, prior to vulcanization, with a vulcanization accelerator to insure a tight cure of this portion of the basic tube. The partitions, or baffles, 14 may be similarly treated.

In the interest of clearness and ease of disclosure, but two baffles, or partitions, are shown on the drawing and described. Two baffles are usually sufficient, although it is obvious that as many baffles may be provided as are desired or found necessary. The number of baffles required may be influenced to a certain extent by the consistency of the plastic material 13.

While above, the tube has been described as preferably made on an air mandrel, it is believed that its manufacture is not limited to this expedient.

Having thus described my invention, what I claim as new and desire to secure by Letters Patent of the United States is:

1. The method of constructing an inner tube for pneumatic tires, which consists in expanding a basic endless tube of vulcanizable material by internal pressure, superimposing upon the tread portion of said tube while so expanded alternate strips of unvulcanizable sealing compound and separator strips of vulcanizable material, the inner edges of said separator strips engaging said endless tube and the outer edges of said separator strips extending to the outer surface of said strips of sealing compound, said strips of sealing compound and said separator strips being arranged longitudinally of said endless tube and in contact with each other, placing a cover sheet of vulcanizable material over said sealing compound and said separator strips, and curing the whole tube structure while expanded in a mold to cause the vulcanizable cover sheet to become vulcanized to the basic tube at its edges and causing the separator strips to become vulcanized to said endless tube at their inner edges and to the cover sheet at their outer edges.

2. The method of constructing an inner tube for pneumatic tires, which consists in expanding an endless basic tube of vulcanizable material by internal pressure, superimposing upon the tread portion of said tube while so expanded alternate strips of unvulcanizable sealing compound and separator strips of vulcanizable material, the two opposite outermost strips being of unvulcanizable material, the inner edges of said separator strips engaging said endless tube and the outer edges of said separator strips extending to the outer surface of said strips of sealing compound, said strips of sealing compound and said separator strips being arranged longitudinally of said endless tube and in contact with each other, covering the sealing compound and separator strips with a sheet of vulcanizable material which extends beyond the edges of the sealing compound and contacts with the basic tube for adhesion thereto, and curing the whole tube structure, while expanded, in a mold to cause the vulcanizable cover sheet, the basic tube and the separator strips to become firmly vulcanized together at their contacting areas.

3. The method of constructing an inner tube for pneumatic tires which consists in forming an endless basic tube of vulcanizable material, expanding said tube by internal pressure, attaching to the outer circumference of said endless tube while inflated a strip of plastic unvulcanizable sealing compound, placing separator strips of vulcanizable material on the opposite lateral edges of said sealing compound, respectively, the inner edge of each of said separator strips being in engagement with the basic tube, placing other strips of sealing compound on the tread portion of said basic tube, on the remote sides of said separator strips, respectively, covering the sealing compound and separator strips with a cover layer of vulcanizable material which extends beyond the edges of the sealing compound and contacts with the endless tube for adhesion thereto and curing the entire tube structure, while expanded, to cause the cover layer, the separator strips and the endless tube to become firmly vulcanized together at their contacting areas.

4. The method of constructing an inner tube for pneumatic tires which consists in forming an endless basic tube of vulcanizable material, expanding said tube by internal pressure, placing on the outer circumference of said endless tube while inflated a longitudinally extending strip of sealing compound, placing separator strips of vulcanizable material on the opposite lateral edges of said sealing compound, respectively, the inner edge of each of said separator strips being in engagement with the basic tube and the outer edge extending to the outer surface of said sealing compound, placing other strips of sealing compound on the tread portion of said basic tube, on the remote sides of said separator strips, respectively, covering the sealing compound and separator strips with a cover layer of vulcanizable material which extends beyond the edges of the sealing compound and contacts with the endless tube for adhesion thereto and curing the entire tube structure, while expanded, to cause the cover layer, the separator strips and the endless tube to become firmly vulcanized together at their contacting areas.

5. The method of constructing an inner tube for pneumatic tires which consists in forming an endless basic tube of vulcanizable material, expanding said tube by internal pressure, placing on the outer circumference of said tube, while inflated, a strip of sealing compound, placing separator strips of vulcanizable material on the opposite lateral edges of said sealing compound, respectively, the inner edges of each of said separator strips being in engagement with the basic tube, placing other strips of sealing compound on the tread portion of said basic tube, on the remote sides of said separator strips, respectively, covering the sealing compound and separator strips with a cover sheet of vulcanizable material which extends beyond the edges of the sealing compound and contacts with the endless tube for adhesion thereto and curing the entire tube structure, while expanded, causing the cover sheet to become vulcanized to the basic tube at its edges and causing the separator strips to become firmly vulcanized to said endless tube at their inner edges and to the cover sheet at their outer edges.

JAMES W. WABER.